(12) United States Patent
Gonzalez De Langarica et al.

(10) Patent No.: US 9,369,887 B2
(45) Date of Patent: Jun. 14, 2016

(54) NETWORK SIGNAL TRACING USING CHARGING IDENTIFIERS AS TRACE RECORDING SESSION REFERENCES

(75) Inventors: Ester Gonzalez De Langarica, Stockholm (SE); Sarah Gannon, Stockholm (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 109 days.

(21) Appl. No.: 13/820,932

(22) PCT Filed: Sep. 21, 2010

(86) PCT No.: PCT/SE2010/051010
§ 371 (c)(1),
(2), (4) Date: Mar. 5, 2013

(87) PCT Pub. No.: WO2012/039655
PCT Pub. Date: Mar. 29, 2012

(65) Prior Publication Data
US 2013/0170386 A1    Jul. 4, 2013

(51) Int. Cl.
*H04W 24/02* (2009.01)
*H04L 12/24* (2006.01)
(Continued)

(52) U.S. Cl.
CPC .............. *H04W 24/02* (2013.01); *H04L 41/12* (2013.01); *H04L 67/146* (2013.01); *H04L 67/22* (2013.01);
(Continued)

(58) Field of Classification Search
CPC ............ H04L 12/26; H04L 12/2678–12/2686; H04L 12/2697; H04L 43/10–43/12; H04L 43/50; H04L 41/12; H04L 67/146; H04L 67/22; H04M 15/58; H04M 15/62; H04M 15/63; H04M 15/82; H04M 15/8228; H04M 2215/208; H04W 24/02; H04W 24/08; H04W 4/24

USPC ........... 370/248, 252, 217, 352, 328, 395.52, 370/401; 455/406, 418, 445–446, 422.1; 709/203, 224, 227–228, 236, 229
See application file for complete search history.

(56) References Cited

U.S. PATENT DOCUMENTS 7,336,620 B2 * 2/2008 Bennett ............... H04L 12/2697
370/252
2004/0121775 A1 * 6/2004 Ropolyi ................. H04L 63/00
455/445

(Continued)

FOREIGN PATENT DOCUMENTS

WO        2009078874 A1    6/2009

OTHER PUBLICATIONS

3GPP TS 32.422 V10.0.0 (Jun. 2010); 3rd Generation Partnership Project; Technical Specification Group Services and System Aspects; Telecommunication management; Subscriber and equipment trace; Trace control and configuration management (Release 10); Section 4.2.3.5-4.2.3.7, 7 pages.

*Primary Examiner* — Mohamed Kamara
(74) *Attorney, Agent, or Firm* — Patent Portfolio Builders, PLLC (57) ABSTRACT

Signaling through a plurality of network elements is traced during a trace session. The network elements generate trace records that record information associated with a communication session and that include a charging identifier that is used as a trace recording session reference for the trace session. The charging identifier is a unique network-wide identifier for a subscriber, UE or service and can be used by an operations support system to correlate which trace records are associated with a same subscriber, UE or service that is being traced and, thereby, may enable end-to-end tracing through a network.

13 Claims, 10 Drawing Sheets

(51) Int. Cl.
   *H04M 15/00* (2006.01)
   *H04W 4/24* (2009.01)
   *H04L 29/08* (2006.01)
   *H04W 24/08* (2009.01)

(52) U.S. Cl.
   CPC .............. *H04M 15/58* (2013.01); *H04M 15/62* (2013.01); *H04M 15/63* (2013.01); *H04M 15/82* (2013.01); *H04M 15/8228* (2013.01); *H04W 4/24* (2013.01); *H04W 24/08* (2013.01); *H04M 2215/208* (2013.01)

(56) References Cited

U.S. PATENT DOCUMENTS

| | | | |
|---|---|---|---|
| 2004/0228362 A1* | 11/2004 | Maki | H04L 63/00 370/467 |
| 2004/0240431 A1* | 12/2004 | Makowski | H04L 12/2697 370/352 |
| 2005/0278420 A1* | 12/2005 | Hartikainen | H04L 63/08 709/203 |
| 2007/0213031 A1 | 9/2007 | Ejzak et al. | |
| 2007/0297419 A1* | 12/2007 | Askerup | H04L 29/12188 370/395.52 |
| 2009/0088129 A1 | 4/2009 | Cai et al. | |
| 2009/0193131 A1* | 7/2009 | Shi | H04L 65/1063 709/229 |
| 2009/0264097 A1* | 10/2009 | Cai | G06Q 30/04 455/406 |
| 2009/0312001 A1* | 12/2009 | Bodog | H04L 12/2602 455/418 |
| 2009/0323965 A1* | 12/2009 | Kenehan | H04W 12/02 380/278 |
| 2010/0165833 A1* | 7/2010 | Du | H04L 69/40 370/217 |

* cited by examiner

NETWORK SIGNAL TRACING USING CHARGING IDENTIFIERS AS TRACE RECORDING SESSION REFERENCES

CROSS REFERENCE TO RELATED APPLICATION(S)

This application is a 35 U.S.C. §371 National Phase Entry Application from PCT/SE2010/051010, filed Sep. 21, 2010, designating the United States, the disclosure of which is incorporated herein in its entirety by reference.

TECHNICAL FIELD

Embodiments described herein relate generally to communication systems and, more particularly, to tracing signals through network elements in a telecommunications system related to a user/subscriber.

BACKGROUND

Monitoring of communications by user equipment units (UEs), network elements (NEs), and other system elements is an increasingly important function. Performance monitoring can enable a network operator to identify bottlenecks and take appropriate actions to improve communication quality. An operations support system can monitor performance using coarse resolution data that has been separately aggregated by network elements to provide a performance metric (e.g., the total number of dropped calls in a cell).

In contrast, signal tracing is another form of monitoring that can provide much more detailed information for a user call. The operations support system can trigger a trace session in all NEs involved in a call path. Each NE then separately creates trace records responsive to various start and stop criteria and reports their trace records to the operations support system. The operations support system can attempt to correlate information within the trace records to trace a call from end-to-end, such as from a UE through a plurality of NEs to another UE. Such call tracing may allow determination of the root cause of call handling problems, optimization of resource usage and communication quality, and/or validation of interfaces between NEs.

Correlation of trace records from Universal Mobile Telecommunications System (UMTS) and Global System for Mobile Communications (GSM) based NEs has been possible using unique network-wide UE identities that are known to those NEs. However, in other systems, such as the 3rd Generation Partnership Project Long Term Evolution (3GPP LTE), NEs do not have access to a unique network-wide UE identity, but only to temporary identities that can change over time. Consequently, an operations support system may not be able to correlate trace records through at least some system NEs and, therefore, may not be able to adequately trace a call from end-to-end.

SUMMARY

Signaling through a plurality of network elements is traced during a trace session. The network elements generate trace records that record information associated with a communication session and that include a charging identifier that is used as a trace recording session reference for the trace session.

The charging identifier can be a unique network-wide identifier for a subscriber, UE or service. When an operations support system receives trace records, it can use the charging identifiers therein to correlate which trace records are associated with a same subscriber, UE or service that is being trace and, thereby, may enable tracing of a communication session from end-to-end for a call.

In some embodiments, the charging identifier may be an IP Multimedia Subsystem (IMS) Charging IDentifier (ICID), which is a unique system-wide charging value. The ICID can be generated by one of the NEs and then distributed to other NEs that are to be involved in a trace for use by those NEs as a trace recording session reference in trace records they generate. For NEs that communicate using SIP messages, the ICID can be communicated to those NEs in a P-Charging-Vector header of a SIP message. In contrast, for NEs that communicate using Diameter protocol messages, the ICID can be communicated to those NEs in an Attribute-Value-Pair (AVP) of a Diameter protocol message. The ICID may be communicated in a Session-ID AVP of a Diameter protocol message or may be communicated in another AVP.

A NE then writes the ICID as a trace recording session reference into a trace record that is associated with a defined subscriber, UE or service being traced. The trace record from that NE and other NEs are communicated to the operations support system for correlation and tracing of the communication session across the NEs and interfaces there between.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION

The invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that it would be unduly repetitious and obfuscating to literally describe and illustrate every combination and subcombination of these embodiments. However, it is intended that all embodiments disclosed herein can be implemented separately or combined in any way and/or combination. Accordingly, the present specification, including the drawings, shall be construed to constitute a complete written description of various exemplary combinations and subcombinations of embodiments and of the manner and process of making and using them, and shall support claims to any such combination or subcombination.

Various embodiments of the present invention are directed to improving tracing of communication sessions through Network Elements (NEs) of a communication system. For troubleshooting and other purposes, network operators need to be able to trace user activity, such as signaling that is traversing different NEs to locate a problem in the network. Once a "faulty" NE has been located, troubleshooting can then be carried out for that specific NE using internal routines and/or more detailed network tracing. Accordingly, the trace function should span an entire communication session, not a single Session Initiation Protocol (SIP) session or leg, and should include the ability to trace through nodes using SIP messaging and/or Diameter protocol messaging. As used herein, a "communication session" can include, but is not limited, a phone call, streaming video, data transfer, etc.

However, in some communication systems, such as LTE, all NEs that are involved in end-to-end handling of a communication session do not have access to a user identity that is unique and maintained throughout a communication session that is to be traced. For example, a NE (e.g., Call Session Control Function (CSCF)) may generate a trace recording session reference based on a user's private ID (e.g., a call-ID), however not all NEs that are to be involved in tracing a communication session end-to-end have access to the user's private ID and, moreover, the UEs who have access to the user's private ID may use the same user private ID for multiple simultaneous communication sessions (e.g., responsive to overlapping SIP dialogs, such as INVITE, SUBSCRIBE, NOTIFY). Consequently, an Operation Support System (OSS) may not be able to correlate trace records that are received from those NEs using the user's private ID in an attempt to trace a particular communication session from end-to-end through the network.

Figure 1A:
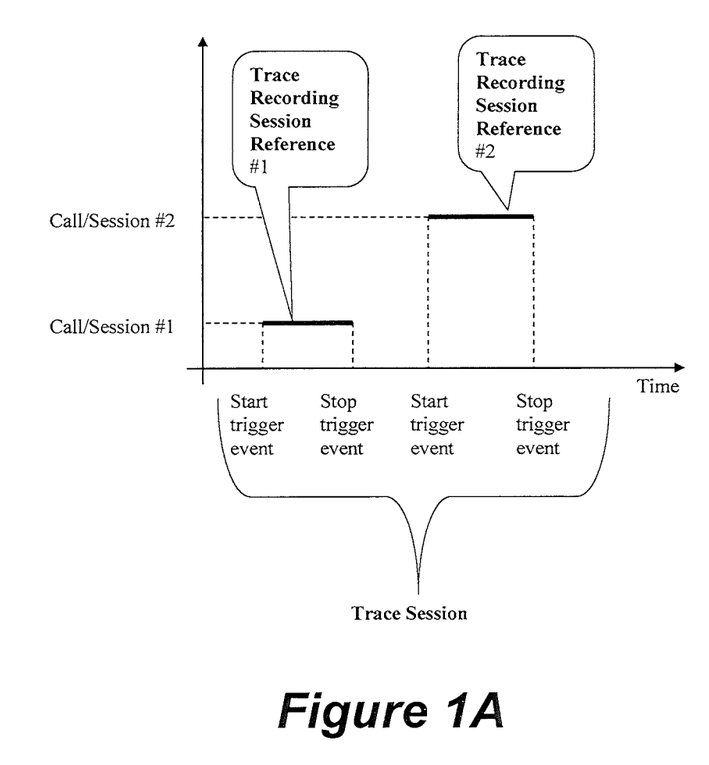
FIGS. 1A-1B illustrate exemplary timelines in which trace sessions are activated and deactivated and in which associated trace recording sessions are started and stopped to record communication sessions.
Figure 1B:
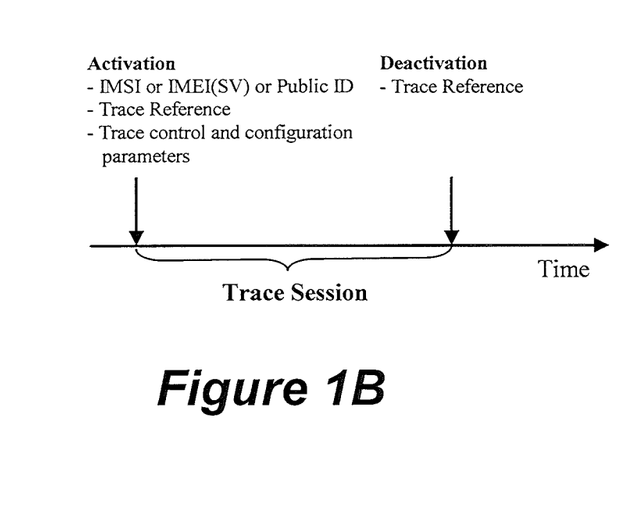

FIGS. 1A-1B illustrate various operations and methods for activating and deactivating trace sessions and for starting and stopping associated trace recording sessions to record communication sessions through network elements. Referring to FIGS. 1A and 1B, a trace session corresponds to a time interval between activation and deactivation of that trace session. A trace session is identified by a trace reference. A plurality of Trace Recording Sessions (TSRs) can be separately triggered during a single trace session in response to triggering events that start and stop a Trace Recording Session Reference (TRSR) as defined by 3GPP TS 32.422 V9.0.1, "Subscriber and Equipment Trace: Trace Control and Configuration Management", which is incorporated herein by reference. During a TSR, each NE that is involved in a communication session generates a trace record that includes a set of traceable data, which is collected responsive to defined trace control and configuration parameters, for the subscriber, UE or service that is being traced. Each TSR is identified by a different TRSR.

In the example of FIG. 1A, during a trace session a first TSR is referenced by TRSR#1 and traces call/session#1 and a subsequent second TSR is referenced by TRSR#2 and traces call/session#2. In the example of FIG. 1B, an element manager (e.g., OSS) can configure NEs to create a trace session by communicating thereto an trace activation message containing activation parameters which may include a International Mobile Subscriber Identity (IMSI), International Mobile Equipment Identity (IMEI), Public ID, Trace Reference, and/or trace control and configuration parameters that are to be used as triggering events for TSRs and to identify what data is to be written into their trace records. The element manager (e.g., OSS) can deactivate a trace session by communicating to the NEs an associated trace deactivation message and TSR identifying the trace session that is to be deactivated.

As defined by 3GPP TS 32.423 V9.1.1, "Subscriber and Equipment Trace: Trace Data Definition and Management", which is incorporated herein by reference, a trace session reference is set by an OSS. In contrast, a TRSR is generated by a NE when a triggering event is satisfied for a TSR. A locally generated TRSR may not be a unique number outside of a NE and, therefore, may not be reliably used to correlate trace records that are received at an OSS from a plurality of NEs. A trace session record also cannot be used to correlate trace records due to it not being unique across the network, because there can be simultaneous SIP/Diameter dialogs for the same UE and which should be correlated separately for tracing purposes.

Various embodiments of the present invention may arise from the present realization that a charging identifier is a unique network-wide identifier for a subscriber, UE or service and can be written by NEs into their trace records for use as a TRSR for a trace recoding session. When an OSS receives trace records, it can use the charging identifiers therein, which are functioning as TRSRs, to correlate which trace records are associated with a same subscriber, UE or service that is being trace and, thereby, may enable tracing of a communication session (e.g., call) from end-to-end through the network. For example, trace records that have the same charging identifier can be identified as being related to the same the same subscriber, UE or service trace.

A charging identifier is created and distributed through NEs that are involved in providing access and services for a communication session, and is used by operators to charge subscribers. In some embodiments, the charging identifier may be an IMS Charging IDentifier (ICID), which is a unique network-wide charging value. The ICID is unique across all 3GPP IMS NEs for a time period of at least one month from when the ICID is no longer being used (i.e., released) by the NE that generated the ICID.

As will be explained in further detail below, the ICID is generated by one of the NEs (e.g., by a NE initiating a SIP or Diameter protocol dialog) and then distributed to other NEs that are to be involved in a trace, and is used by the receiving NEs as a TRSR that is written into trace records that they generate. For NEs that communicate using SIP messages, the ICID can be communicated to those NEs in a P-Charging-Vector header of a SIP message. In contrast, for NEs that communicate using Diameter protocol messages, the ICID can be communicated to those NEs in an Attribute-Value-Pair (AVP) of a Diameter protocol message. The ICID may, for example, be communicated in a Session-ID AVP of a Diameter protocol message or may be communicated in another AVP that is defined by IETF RFC 358, "Diameter Base Protocol", which is incorporated herein by reference, or in a new AVP that is defined for Diameter protocol messaging. SIP message signaling is defined by, for example, IETF Organization RFC 3261. Diameter message signaling is defined by, for example, IETF Organization RFC 3588.

A NE then writes the ICID as a trace recording session reference into a trace record that is associated with a defined subscriber, UE or service being traced. The trace record from that NE and other NEs are communicated to an OSS. The OSS uses the ICIDs in the received trace records to identify which of the trace records are associated with a same trace session. The OSS can thereby generate a trace for a particular communication session from end-to-end through the network.

Figure 2:
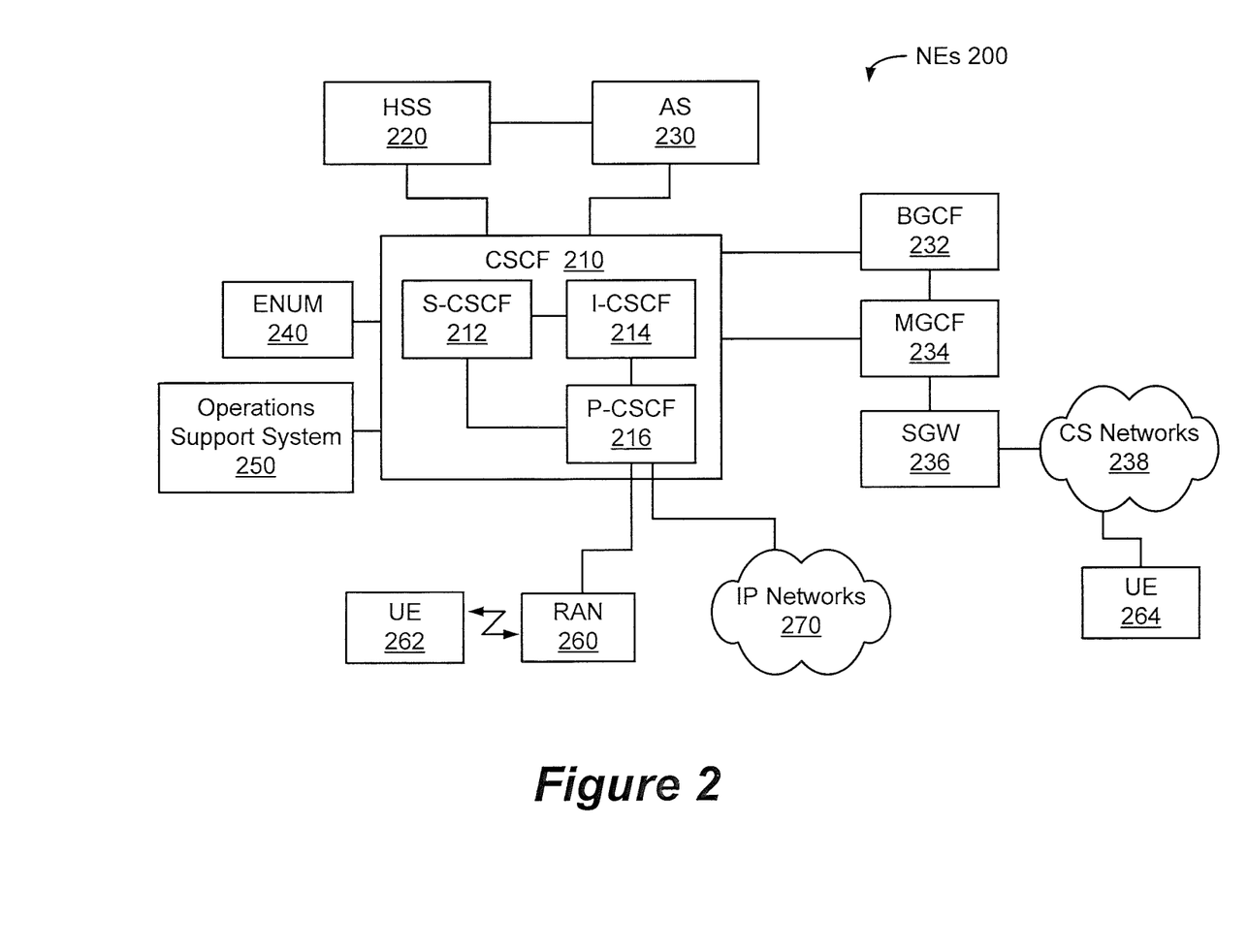
FIG. 2 illustrates a diagram of an exemplary IP Multimedia Subsystem (IMS) network in which systems and/or methods described herein may be implemented in accordance with various embodiments of the present invention.

These and other embodiments will now be explained in further detail below with regard to FIG. 2 which illustrates exemplary NEs of an IP Multimedia Subsystem (IMS) network 200 in which systems and/or methods described herein may be implemented. Referring to FIG. 2, the network 200 may include a Call Session Control Function (CSCF) 210, a Home Subscriber Server (HSS) 220, an Application Server (AS) 230, an Electronic NUMbering unit 240, an Operations Support System (OSS) 250, a Breakout Gateway Control Function (BGCF) 232, a Media Gateway Controller Function (MGCF) 234, a Signaling Gateway (SGW) 236, a Radio Access Network (RAN) 260, and various IP networks 270 and circuit switched (CS) networks 238 (e.g., PSTN).

The HSS 220 is a database that contains subscription-related information (e.g., subscriber profiles), and performs authentication and authorization of users, and can provide information about a subscriber's location and IP information. The CSCF 210 can include a Serving-CSCF (S-CSCF) 212, an Interrogating-CSCF (I-CSCF) 214, and a Proxy-CSCF (P-CSCF) 216.

The S-CSCF 212 is a SIP server and performs session control, including SIP registrations, routing lookups in the ENUM 240, and is in the path of all signaling messages of locally registered users and can be used to inspect all such messages. The S-CSCF 212 communicates though Diameter Cx and Dx interfaces to the HSS for UE authentication, authorization, and locating and can be used to download provisioned UE data.

The I-CSCF 214 is another SIP function that is located at the edge of an administrative domain. Its IP address is published in the Domain Name System (DNS) of the domain, so that remote servers can find it and use it as a forwarding point (e.g. registering) for SIP packets to that domain. The I-CSCF 214 queries the HSS 220 to retrieve the address of the S-CSCF 212 and to assign it to a user performing SIP registration, and it forwards SIP requests or responses to the S-CSCF 212.

The P-CSCF 216 is a SIP proxy that is the first point of IMS contact for UEs, such as UEs 262 and 264. The UEs 262 and 264 can, for example, discover the P-CSCF 216 with either Dynamic Host Configuration Protocol (DHCP) or they may be configured during initial provisioning or via a 3GPP IMS Management Object (MO). The P-CSCF 216 is on the path of and can inspect all signaling to/from the UEs 262 and 264. The P-CSCF 216 generates charging records, including ICIDs, for calls/sessions with each of the UEs 262 and 264.

The BGCF 232 is a SIP proxy which processes requests for routing from the S-CSCF 212. The MGCF 234 is a SIP endpoint that does call control protocol conversion between SIP and ISDN User Part (ISUP)/Bearer Independent Call Control (BICC) and interfaces with the SGW 236 over Stream Control Transmission Protocol (SCTP). The SGW 236 interfaces with the signaling plane of the CS network 238, and transforms lower layer protocols as Stream Control Transmission Protocol (IP protocol) into Message Transfer Part (Signalling System 7 protocol) to pass ISDN User Part (ISUP) from the MGCF 234 to the CS network 238. The AS 230 hosts and executes services, and interfaces with the S-CSCF 212 using SIP messages and may interface with the HSS 220 using Diameter messages.

The BGCF 232 interconnects to the I-CSCF 214 through a SIP Mi interface, interconnects to the MGCF 234 through a SIP Mj interface, and interconnects to another BGCF through a SIP Mk interface or another IP multimedia network.

The RAN 260 provides radio communications with the UE 262 using, for example, operations in any of the following Radio Access Technologies: GSM, code division multiple access (CDMA), wideband-CDMA, CDMA2000, UMTS, 3GPP LTE, Wi-Fi, and/or WiMAX. Other Radio Access Technologies may alternatively or additionally be used in embodiments according to the invention.

Although FIG. 2 shows exemplary NEs of the network 200, in various other embodiments the network 200 may contain fewer, different, or additional NEs than depicted in FIG. 2. In still other embodiments, one or more of the NEs may perform one or more other functions that have been described as being performed by other NEs.

The OSS 250 is configured to trace signaling for a communication session from end-to-end through the NEs and interfaces (i.e., SIP, Diameter, and other) of network 200 during a trace session. The OSS 250 can activate a trace session by communicating a trace activation message containing an associated TSR and trace control and configuration parameters, which identify a set of data (information) that is to be traced, to NEs that are to be involved in tracing a communication session. In accordance with some embodiments, at least some of the NEs are configured to generate trace records that record information associated with the communication session and that include a charging identifier, such as an ICID, that is used as a TRSR for the trace session. As explained above, for NEs that communicate using SIP messages, the ICID can be communicated to those NEs in a P-Charging-Vector header of a SIP message. In contrast, for NEs that communicate using Diameter protocol messages, the ICID can be communicated to those NEs in an AVP of a Diameter protocol message, such as in a Session-ID AVP or another AVP.

The NEs communicate their trace records via data files to the OSS 250. The OSS 250 use the charging identifiers therein to correlate which trace records are associated with a same communication session and trace session (e.g., identify which trace records contain the same ICID and TSR) from end-to-end through all NEs that have reported corresponding trace records. This information can allow the OSS 250 to determine the root cause of a malfunctioning UE, to carry-out advanced troubleshooting, to optimize NE resource usage and quality, to carry-out dropped call analysis, and/or to validate interfaces between NEs.

Figure 3A:
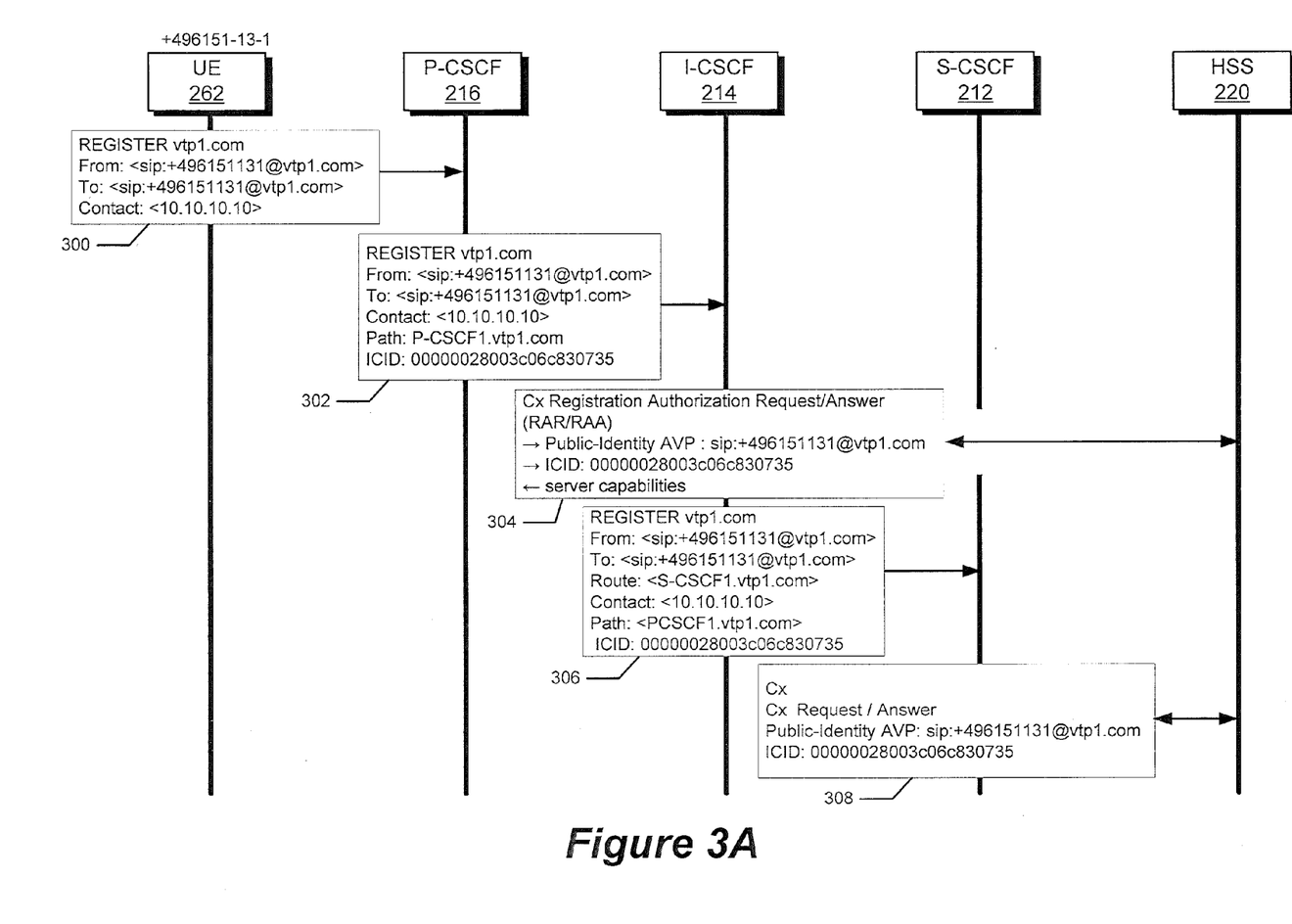
FIGS. 3A-3B show a signal flow diagram of operations and methods that may be performed during a registration process by user equipment and network elements of the network illustrated in FIG. 2.
Figure 3B:
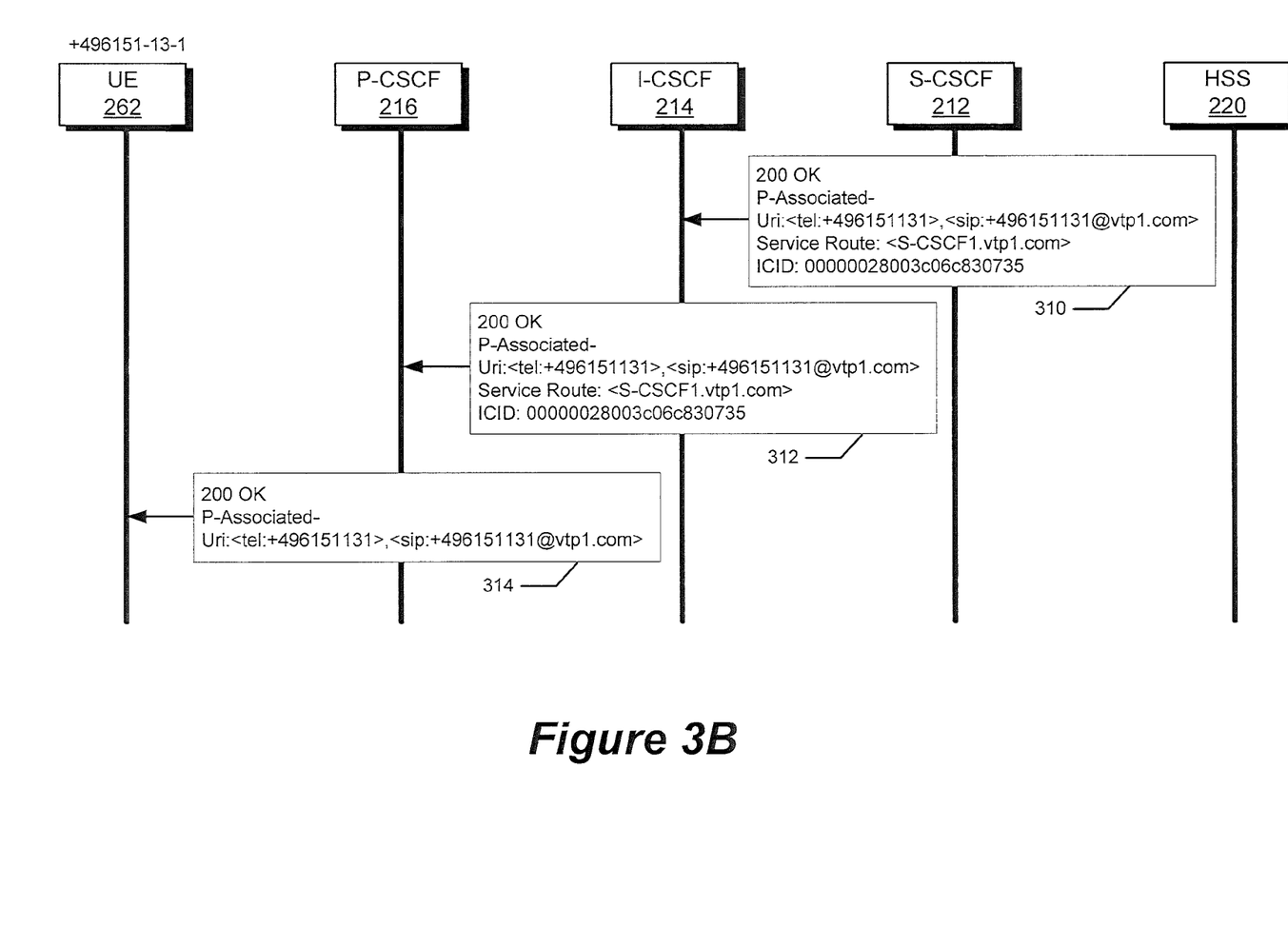

FIGS. 3A-3B shows a signal flow diagram of operations and methods that may be performed during a registration process by the UE 262 and various NEs of the network 200 illustrated in FIG. 2. Referring to FIGS. 3A-3B, the UE 262 (e.g., phone number 496151131) generates (Block 300) a SIP Register message that is communicated to the P-CSCF 216. The SIP Register message can also identify a location (i.e., 10.10.10.10) of the UE 262. The ICID is generated by the first IMS node handling the SIP session and, therefore, is generated by the P-CSCF 216. The value of the ICID parameter may be the same as the "icid-value" parameter that is defined in IETF TS 24.229 and, accordingly, may be coded as a text-based UTF-8 charset.

The ICID may be generated by the P-CSCF 216 when the session/event originates in IMS and may be generated by I-CSCF 214 when the session/event terminates in IMS. When the AS 230 initiates SIP sessions it may generate an ICID which is communicated to NEs along the SIP signaling path. The HSS 220 may generate an ICID which is communicated through a Cx interface to NEs along the SIP signaling path. However, irrespective of where the ICID is generated, the NEs receiving a SIP message and/or Diameter message can identify any ICID contained therein and use the ICID as a TRSR in a trace record file that it may generate for an identified communication session.

The P-CSCF 216 may use the ICID as a TRSR in a trace record file that it may generate for a communication session for a user (e.g., User ID-S of trace session), and communicates (Block 302) the ICID in a P-Charging-Vector header of a SIP Register message to the I-CSCF 214. The I-CSCF 214 identifies the ICID in the received SIP message header as being a TRSR and may use the ICID as a TRSR in a trace record file that it may generate for the communication session the user (e.g., User ID-S of trace session). The I-CSCF 214 communicates (Block 304) the ICID to the HSS 220 during a Cx interface Registration Authorization Request/Answer message flow using an AVP of a Diameter message. The AVP that is used to carry the ICID may be the Session-ID AVP and/or may be another AVP that can be carried in a Diameter message. The HSS 220 responds thereto by using the ICID as a TRSR in a trace record file that it may generate for the communication session the user (e.g., User ID-S of trace session) and by responding to the I-CSCF 214 with identification of server capabilities.

The Session-ID AVP is used in the Diameter message to identify a specific session, and all messages pertaining to that specific session include the same Session-ID AVP value which is be used throughout the life of the session. The Session-ID AVP may be coded as a UTF8String. When the ICID is written as a TRSR in a trace record file, it may be written in a 2 byte octet string, which is a conventional format for a TRSR string, or it may coded in the same format as the SIP AVP from which it was obtained.

When the ICID is embedded in the Session-ID AVP, it can immediately follow the Diameter header and can include a mandatory portion, as defined by IETF RFC 3588, along with an implementation-defined portion. In some embodiments, the Session-ID AVP begins with the sender's identity encoded as a DiameterIdentity type followed by a semicolon character ";" and then the ICID. Accordingly, the semicolon character ";" can be used by a receiving NE to delineate the sender's identity from the following ICID in the Session-ID AVP. For example, as shown in FIG. 3A, an ICID value "00000028003c06c830735" is being communicated in a Session-ID AVP and appears as "accespoint7.acme.com; 1876543210;523;00000028003c06c830735".

The I-CSCF 214 also communicates (Block 306) the ICID to the S-CSCF 212 in the P-Charging-Vector header of a SIP Register message. The S-CSCF 212 can use the ICID as a TRSR in a trace record file that it may generate for the communication session with the UE 262 (e.g., User ID-S of trace session), and communicates (Block 308) the ICID to the HSS 220 through a Cx Request message using an AVP of a Diameter message. The S-CSCF 212 communicates (Block 310) an OK answer SIP message to the I-CSCF 214, which responds thereto by communicating (Block 312) an OK answer SIP message to the P-CSCF 216, and which responds thereto by communicating (Block 314) an OK answer SIP message to the UE 262.

In HSS 220 initiated procedures (e.g., update of user profile, administrative deregistration, etc.), the HSS 220 can generated an ICID and communicate it through the Cx interface via an AVP of a Diameter message.

Figure 4:
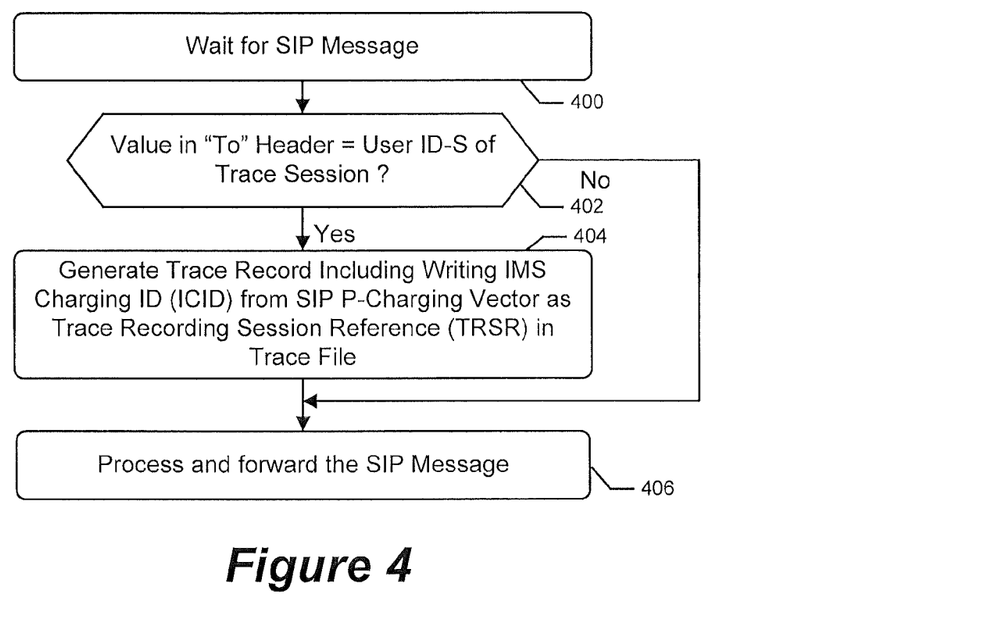
FIG. 4 is a flowchart for operations and methods for generating trace records and which may be performed by various network elements illustrated in FIG. 2 in response to defined Session Initiation Protocol (SIP) messages and the registration process of FIGS. 3A-3B.

FIG. 4 is a flowchart for operations and methods for generating trace records and which may be performed by various NEs illustrated in FIG. 2 that are to be traced in response to defined SIP messages and the registration process of FIGS. 3A-3B. Referring to FIG. 4, a NE, such as the S-CSCF 212 and I-CSCF 214, waits for a SIP message (Block 400). When a value in the To header of a received SIP message is determined (Block 402) to be equal to a value of the User ID-S of a trace session (e.g., earlier received via a trace activation message from the OSS 250), the NE generates (Block 404) a trace record (writes to a trace file in memory) that includes the ICID from the SIP P-Charging Vector header of the SIP message, which is written as a TRSR in the trace record, and that includes a set of traceable data that has been defined by trace control and configuration parameters for the trace session. The NE may name the file containing the trace record using the ICID and the trace session reference. The NE also further processes and forwards (Block 406) the SIP message according to convention functionality of the particular NE.

Figure 5:
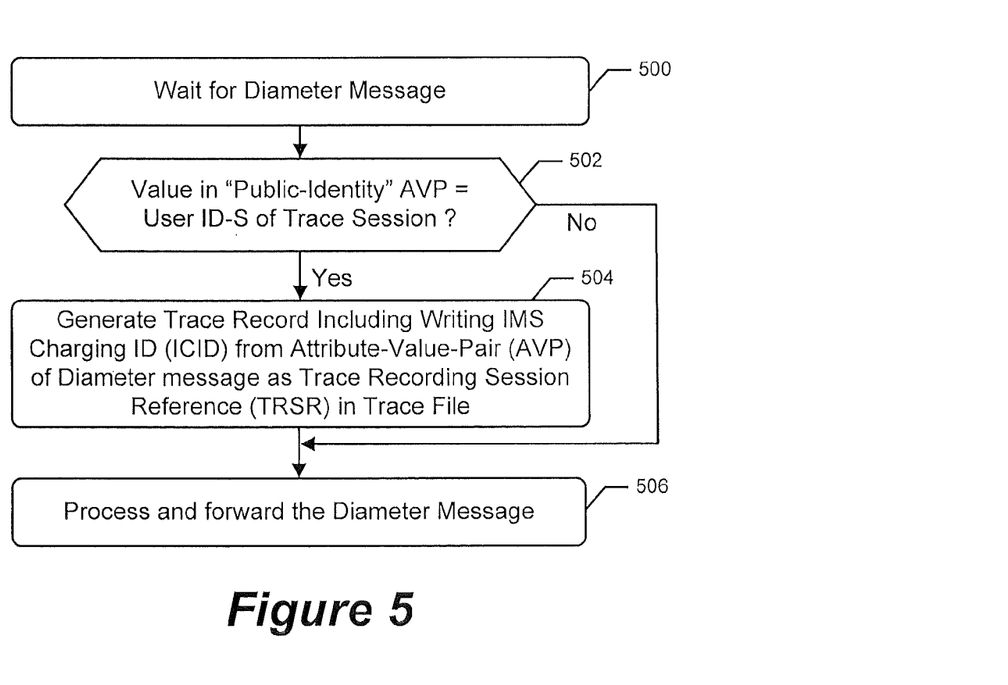
FIG. 5 is a flowchart of operations and methods for generating trace records and which may be performed by various network elements illustrated in FIG. 2 in response to defined Diameter messages.

FIG. 5 is a flowchart of operations and methods for generating trace records and which may be performed by various NEs illustrated in FIG. 2 that are to be traced in response to defined Diameter messages. Referring to FIG. 5, a NE (e.g., HSS 220, S-CSCF 212 and/or I-CSCF 214) waits (Block 500) for a Diameter message. In response to receiving a Diameter message, the NE compares (Block 502) a value in the "Public-Identity" AVP of the received message to a value of the User ID-S (e.g., earlier received via a trace activation message from the OSS 250) and, when they are equal, the NE generates (Block 504) a trace record (writes to a file in memory) that includes the stored ICID from an AVP (e.g., Session-ID AVP) of a Diameter message as a TRSR in the trace record, and that includes a set of traceable data that has been defined by trace control and configuration parameters for the trace session. The NE may name the file containing the trace record using the ICID and the TSR. The NE also further processes and forwards (Block 506) the Diameter message according to convention functionality of the particular NE.

Although these operations and methods for generating trace records have been described in FIGS. 4 and 5 in the context of a registration process, similar processes may be carried out during a third party application server registration process to generate an ICID and propagate the ICID through SIP and Diameter messages to NEs for use as a TRSR in associated trace records.

Figure 6:
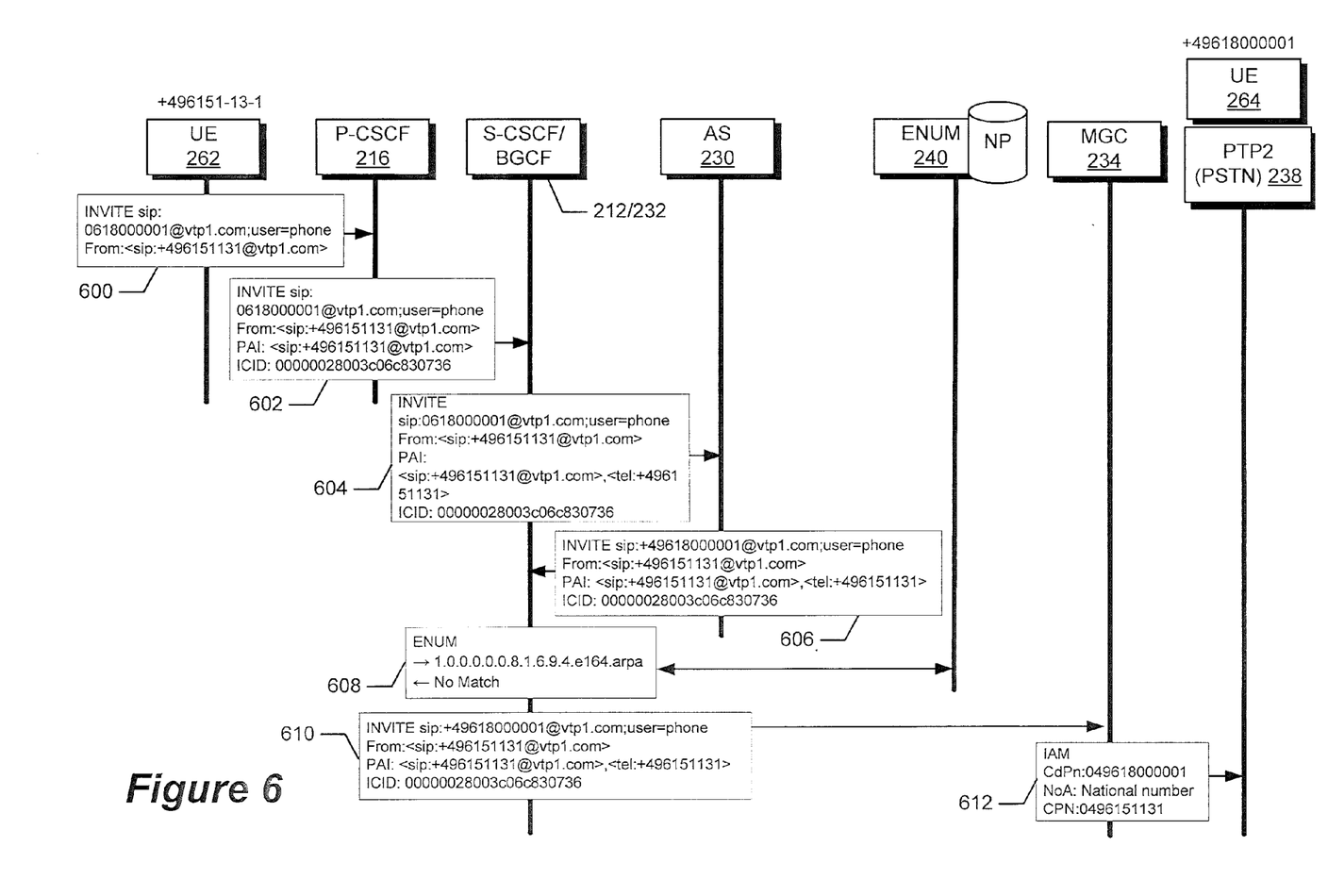
FIG. 6 shows a signal flow diagram for operations and methods that may be performed during an IMS to Public Switched Telephone Network (PSTN) call process by user equipment and network elements of the network illustrated in FIG. 2.

FIG. 6 shows a signal flow diagram for operations and methods that may be performed during an IMS to Public Switched Telephone Network (PSTN) (e.g., CS network 238) call process by UEs and NEs of the network 200 illustrated in FIG. 2. Referring to FIG. 6, the UE 262 (e.g., phone number 496151131) generates (Block 600) a SIP Invite message that is communicated to the P-CSCF 216. An ICID is generated by the first IMS node handling the SIP session and, therefore, is generated by the P-CSCF 216. The value of the ICID parameter may be the same as the "icid-value" parameter that is defined in IETF TS 24.229.

The P-CSCF 216 uses the ICID as a TRSR in any trace record that it may generate for the user (e.g., User ID-S of trace session) and SIP message, and communicates (Block 602) the ICID in a P-Charging-Vector header of a SIP Invite message to the S-CSCF 212 and/or the BGCF 232. The S-CSCF 212/GBCF 232 identifies the ICID in the received SIP message header as being a TRSR for use in a trace session and uses the ICID as a TRSR in any trace record that it may generate for the user (e.g., User ID-S of trace session) and SIP message. The S-CSCF 212/GBCF 232 communicates (Block 604) the ICID in a P-Charging-Vector header of a SIP Invite message to the AS 230, which responds (Block 606) thereto with a SIP Invite message containing the ICID.

The S-CSCF 212/GBCF 232 communicates (Block 608) the ICID to the ENUM 240 during a Cx interface number lookup message flow using an AVP of a Diameter message. The AVP that is used to carry the ICID may be the Session-ID AVP and/or may be another AVP that can be carried in a Diameter message. The S-CSCF 212/GBCF 232 then communicates (Block 610) the ICID in a P-Charging-Vector header of a SIP Invite message to the MGC 234, which responds thereto by communicating (Block 612) to setup a call pathway through the PSTN 238 to the UE 264 (phone number 49618000001) being called.

Figure 7:
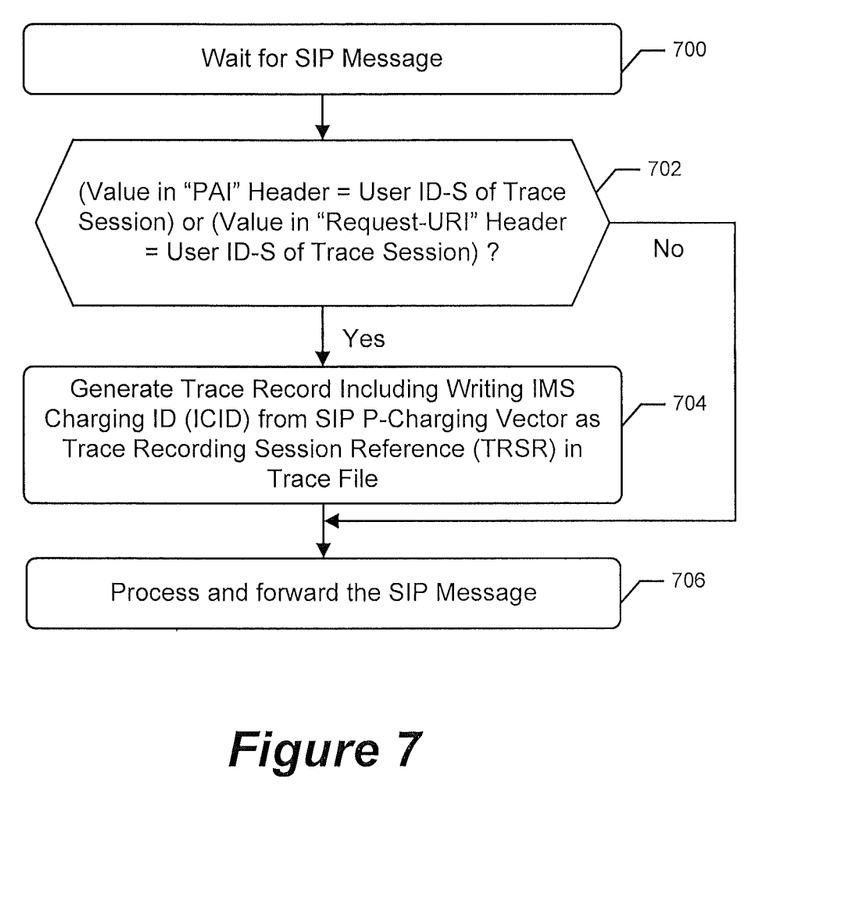
FIG. 7 is a flowchart for operations and methods for generating trace records and which may be performed by various network elements illustrated in FIG. 2 in response to defined SIP messages and the call process of FIG. 6.

FIG. 7 is a flowchart for operations and methods for generating trace records and which may be performed by various NEs illustrated in FIG. 2 that are to be traced in response to defined SIP messages and the call process of FIG. 6. Referring to FIG. 7, the NE waits for a SIP message (Block 700). In response to receiving a SIP message, a determination (Block 702) is made as to whether a value in the "PAI" (P-Asserted-Identity) header of the SIP message is equal to a value of the User ID-S of a trace session (e.g., earlier received via a trace activation message from the OSS 250) or if a value in the "Request-URI" header of the SIP message is equal to a value of the User ID-S of a trace session. When the determination is true, the NE generates, by writing to a file in memory, (Block 704) a trace record that includes the ICID from the P-Charging-Vector header of the SIP message as a TRSR for the trace record, and includes a set of traceable data that has been defined by trace control and configuration parameters for the trace session. The NE may name the file containing the trace record using the ICID (serving as a TRSR) and the trace session reference. The NE also further processes and forwards (Block 706) the SIP message according to convention functionality of the particular NE.

Figure 8:
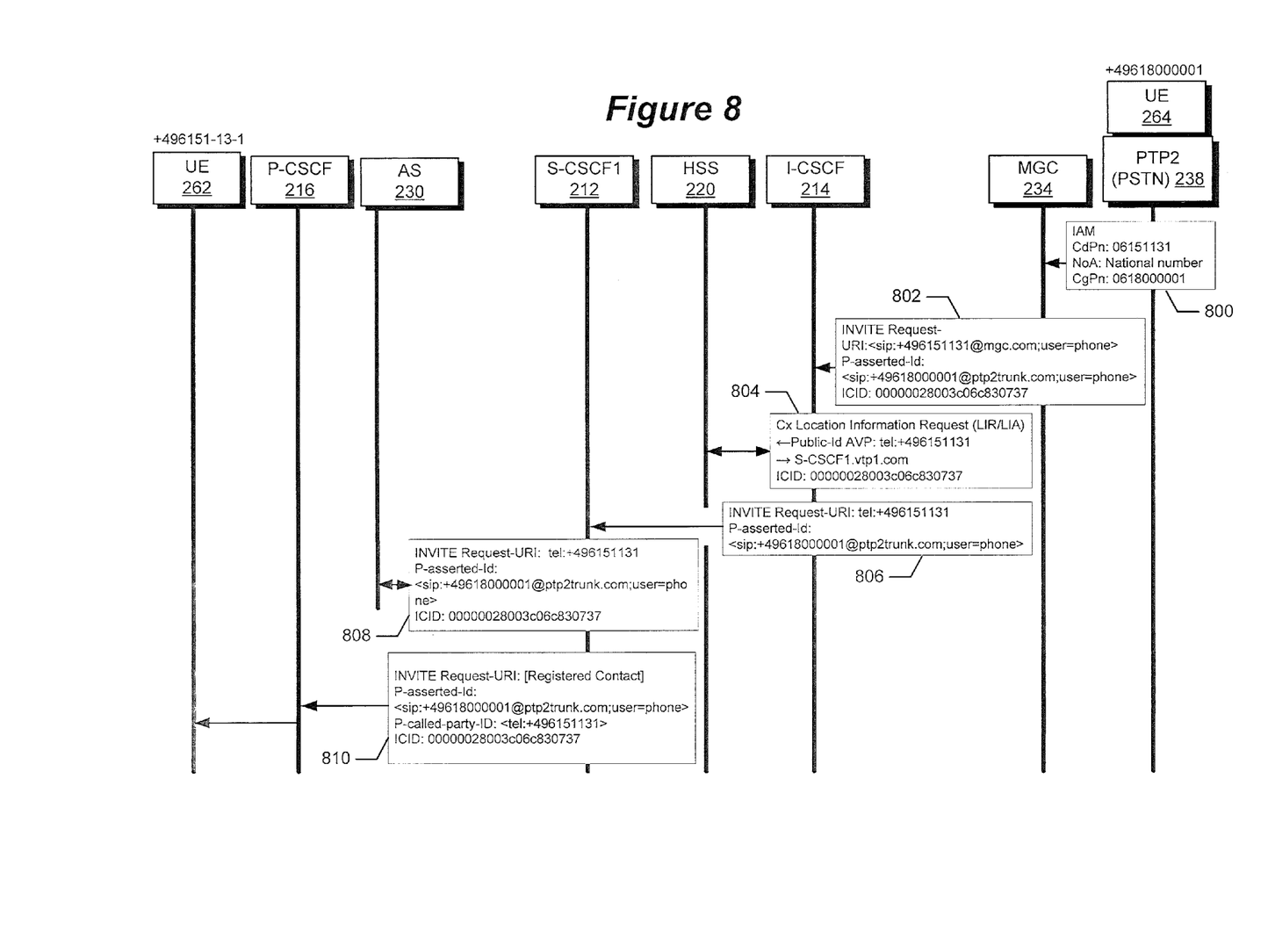
FIG. 8 shows a signal flow diagram for operations and methods that may be performed during a PSTN to IMS call process by user equipment and network elements of the network illustrated in FIG. 2.

FIG. 8 shows a signal flow diagram for operations and methods that may be performed during a PSTN (e.g., CS network 238) to IMS call process by UEs and network NEs of the network 200 illustrated in FIG. 2. Referring to FIG. 8, the UE 264 (e.g., phone number 49618000001) initiates a call to UE 262 (e.g., phone number 49615131), which triggers the PSTN 238 to establish (Block 800) a connection to the MGC 234. An ICID is generated by the first IMS node handling the SIP session and, therefore, is generated by the MGC 234. The value of the ICID parameter may be the same as the "icid-value" parameter that is defined in IETF TS 24.229. The MGC 234 generates (Block 802) a SIP Invite message that is communicated to the I-CSCF 214 with the ICID in the P-Charging-Vector header, and may use the ICID as a TRSR in any trace record that it may generate for the user (e.g., User ID-S of trace session).

The I-CSCF 214 uses the ICID as a TRSR in any trace record that it may generate for the user (e.g., User ID-S of trace session) and SIP message, and communicates (Block 804) the ICID to the HSS 220 during a Cx location information request message flow using an AVP (e.g., Session-ID AVP and/or may be another AVP) of a Diameter message. The I-CSCF 214 then communicates (Block 806) the ICID in a P-Charging-Vector header of a SIP Invite message to the S-CSCF 212. The S-CSCF 212 identifies the ICID in the received SIP message header as being a TRSR for use in a trace session and uses the ICID as a TRSR in any trace record that it generates for the user (e.g., User ID-S of trace session). The S-CSCF 212 communicates (Block 808) the ICID in a P-Charging-Vector header of a SIP Invite message to the AS 230 to obtain service information. The S-CSCF 212 then communicates (Block 810) the ICID in a P-Charging-Vector header of a SIP Invite message to the P-CSCF 216, which further forwards the SIP Invite message to the UE 262.

Figure 9:
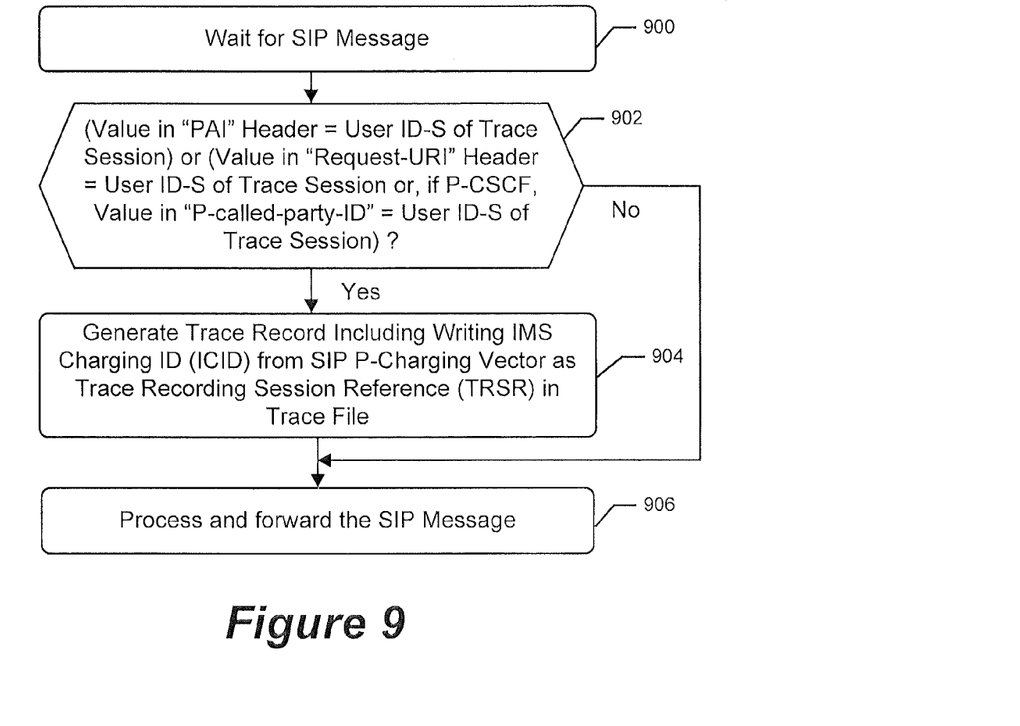
FIG. 9 is a flowchart for operations and methods for generating trace records and which may be performed by various network elements illustrated in FIG. 2 in response to defined SIP messages and the call process of FIG. 8.

FIG. 9 is a flowchart for operations and methods for generating trace records and which may be performed by various NEs illustrated in FIG. 2 in response to defined SIP messages and the call process of FIG. 8. Referring to FIG. 9, a NE waits for a SIP message (Block 900). When a value in the "PAI" (P-Asserted-Identity) header of a received SIP message is determined (Block 902) to be equal to a value of the User ID-S of a trace session (e.g., earlier received via a trace activation message from the OSS 250) or when a value in the "Request-URI" header of the SIP message is determined (Block 902) to be equal to a value of the User ID-S of a trace session, or when the NE is the P-CSCF 216 and a value in the "P-called-party-ID" header of the SIP message is determined (Block 902) to be equal to a value of the User ID-S of a trace session then the NE generates, by writing to a file, (Block 904) a trace record that includes the ICID from the SIP P-Charging Vector of the SIP message used as a TRSR for the trace record, and further includes a set of traceable data that has been defined by trace control and configuration parameters for the trace session. The NE may name the file containing the trace record using the ICID (serving as a TRSR) and the trace session reference. The NE also further processes and forwards (Block 906) the SIP message according to convention functionality of the particular NE.

Figure 10:
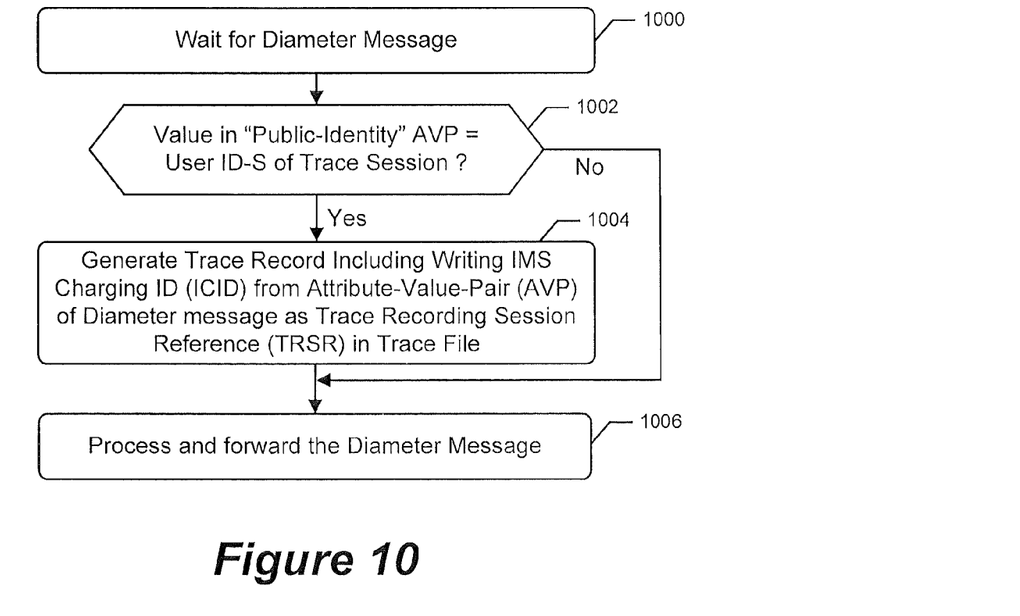
FIG. 10 is a flowchart of operations and methods for generating trace records and which may be performed by various network elements illustrated in FIG. 2 in response to defined Diameter messages and the call process of FIG. 8.

FIG. 10 is a flowchart of operations and methods for generating trace records and which may be performed by various NEs illustrated in FIG. 2 in response to defined Diameter messages and the call process of FIG. 8. Referring to FIG. 10, when a NE receives (Block 1000) a Diameter message, it compares (Block 1002) a value in the "Public-Identity" AVP of the received message to a value of the User ID-S (e.g., earlier received via a trace activation message from the OSS 250). When the values are equal, the NE generates, by writing to a file in memory, (Block 1004) a trace record that includes the ICID from the AVP (e.g., Session ID AVP) of the Diameter message as a TRSR for the trace record, and further includes a set of traceable data that has been defined by trace control and configuration parameters for the trace session. The NE may name the file containing the trace record in response to the stored ICID (serving as a TRSR) and the TSR. The NE also further processes and forwards (Block 1006) the Diameter message according to convention functionality of the particular NE.

Figure 11:
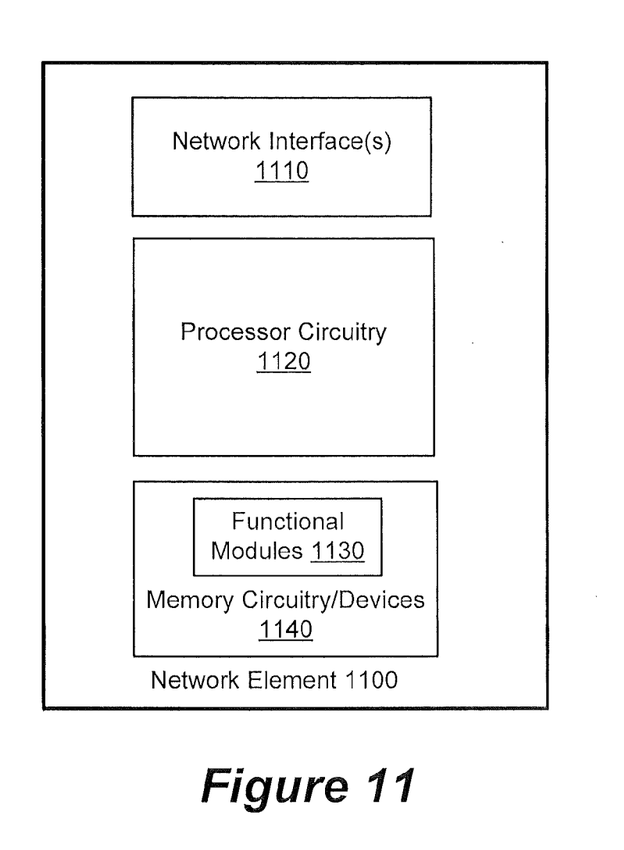
FIG. 11 is a block diagram of exemplary components that may be included in one or more of the network elements illustrated in FIG. 2.

FIG. 11 is a block diagram of exemplary components that may be included in one or more of the NEs (e.g., CSCF 210, HSS 220, AS 230, ENUM 240, OSS 250, BGCF 232, MBCF 234, SGW 236, and/or the OSS 250) that are illustrated in FIG. 2. Referring to FIG. 11, a NE 1100 includes one or more network interfaces 1110, processor circuitry 1120, and memory circuitry/devices 1140 that contain functional modules 1130.

The processor circuitry 1120 may include one or more data processing circuits, such as a general purpose and/or special purpose processor (e.g., microprocessor and/or digital signal processor). The processor circuitry 1120 is configured to execute computer program instructions from the functional modules 1130 in the memory circuitry/devices 1140, described below as a computer readable medium, to perform some or all of the operations and methods that are described above for one or more of the embodiments, such as the embodiments of FIGS. 1-10 and 12.

Accordingly, the processor circuitry 1120 is configured by execution of the computer program instructions in the functional modules 1130 to create trace records within the NE 1100 and through the network interface(s) 1110. The network interfaces 1110 that may be supported by the NE 1100 with associated functional operations being performed by the processor circuitry 1120 may include one or more of the following:

Cx (Diameter) interface between CSCF 210 and HSS 220 used for authentication, authorization, and locating a user;

Dh (Diameter) interface used to determine from the AS 230 a name of the HSS 220 that serves a user when more than one of the HSSs 220 is present;

Dx (Diameter) interface used by CSCF 210 to determine from a Subscriber Location Function (SLF) a name of the HSS 220 that serves a user when more than one of the HSS 220 is present;

Gm (SIP) interface used between a Session Border Gateway (SBG) and P-CSCF 216;

ISC (SIP) interface which is responsive to a SIP request matching a triggering criteria between S-CSCF 216 and Media Resource Function Controller (MRFC) (e.g., Invite, Refer, Subscribe messages), between S-CSCF 212 and Presence Basic, and between S-CSCF 212 and a Multimedia Telephony Application Server (MTAS);

Rx (Diameter) interface for exchanging policy messages between the P-CSCF 216 and a Policy Control and Charging Function (PCRF);

Ro (Diameter) interface between CSCF 210 and MTAS and an Online Charging Function (OCF) for online charging;

Mw (SIP) interface used between two CSCFs to setup, control, and release sessions;

Mg (SIP) interface used to interconnect the MGCF 234 and the I-CSCF 214; Mi (SIP) interface used to interconnect the BGCF 232 and the CSCF 210;

Mi (SIP) interface used to interconnect the BGCF 232 and the CSCF 210;

Mj (SIP) interface used to interconnect the BGCF 232 and MGCF 234;

Mk (SIP) interface used to interconnect the BGCF 232 with another BGCF or another IP Multimedia Network;

Mx (SIP) interface used to interconnect the BGCF 232 and a Session Border Gateway (SBG); and Sh (Diameter) interface used by the MTAS to fetch data, update, subscribe to changes and receive notification of changes of subscription data stored in the HSS 2220.

Accordingly, the various operations and method described herein, the NEs of FIG. 2 can be configured to generate trace records that can be correlated by the OSS 250 to generate an end-to-end trace through NEs and interface that can include, but is not limited to:

HSS (220)/Subscriber Location Function with Diameter interfaces Sh/Dh and Cx/Dx;

CSCF 210 with Diameter interfaces Cx, Rx, and Ro and SIP interfaces ISC and Mw;

MGCF 234 with SIP interfaces Mg and Mj;

Session Border Gateway (SBG) between the CSCF 210 and various network elements (e.g., GGSN, SGSN) interconnecting the RAN 260 with Diameter interfaces Rq, e2, and Rx and SIP interfaces Mx, Mw, Gm, and Lc; and Multimedia Telephony Application Server (e.g., AS 230) with Diameter interfaces Sh/Dh and Ro and SIP interfaces ISC.

When the circuitry of FIG. 11 is used in the OSS 250, the processor circuitry 1120 can be configured by execution of the computer program instructions in the functional modules 1130 to carry out the functionality described above for the OSS 250. For example, the processor circuitry 1120 can be configured to create a trace session by communicating to NEs, which are to be involve in a trace, a trace activation message containing activation parameters which may include an IMSI, IMEI, Public ID, Trace Reference, and/or trace control and configuration parameters that are to be used as triggering events for TSRs and to identify what data is to be written into their trace records.

Figure 12:
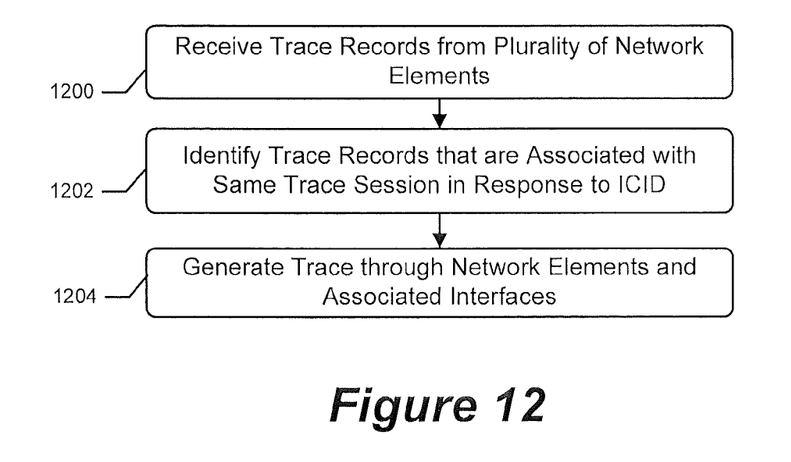
FIG. 12 is a flowchart of operations and methods that generate a trace through network elements and associated interfaces in accordance with some embodiments.

FIG. 12 is a flowchart of operations and methods that may be carried out by the OSS 250 to generate a trace through network elements and associated interfaces in accordance with some embodiments. Referring to FIG. 12, the processor circuitry 1120 can be configured to receive (Block 1200) trace record files from the NEs and to use the charging identifiers (e.g., ICIDs) therein as TRSRs to correlate which trace records are associated with a same communication session and trace session (e.g., identify (Block 1202) which trace records contain the same ICID and TSR). The processor circuitry 1120 can thereby generate (Block 1204) a trace a communication session from end-to-end through all NEs and associated interfaces. This information can allow the OSS 250 to determine the root cause of a malfunctioning UE, to carry-out advanced troubleshooting, to optimize NE resource usage and quality, to carry-out dropped call analysis, and/or to validate interfaces between NEs.

In the above explanation of exemplary embodiments of the invention, it is to be understood that, when an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. In the description and appending drawings, like numbers refer to like elements throughout. Furthermore, "coupled", "connected", "responsive", or variants thereof as used herein may include wirelessly coupled, connected, or responsive. The terminology used herein is for the purpose of describing particular embodiments only and is not intended to be limiting of the invention. As used herein, the singular forms "a", "an" and "the" are intended to include the plural forms as well, unless the context clearly indicates otherwise. Well-known functions or constructions may not be described in detail for brevity and/or clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

Exemplary embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present invention. All such variations and modifications are intended to be included herein within the scope of the present invention, as set forth in the following claims.

What is claimed is:

1. A computer-implemented method for tracing signaling through a plurality of network elements (NEs) during a trace session, wherein a first one of the network elements comprises an Interrogating Call Session Control Function (I-CSCF) network element, the method comprising:
receiving at the I-CSCF network element a call invite message from a communication terminal (UE) via a Media Gateway Control Function (MGCF) and, responsive to the call invite message, generating a first SIP message with an IP Multimedia Subsystem (IMS) Charging IDentifier (ICID) in a P-Charging-Vector header and communicating the first SIP message from the I-CSCF network element to a Serving Call Session Control Function (S-CSCF) network element;
further responsive to receiving the call invite message at the I-CSCF network element, generating a first Diameter protocol message with an Attribute-Value-Pair (AVP) containing the ICID and communicating the first Diameter protocol message from the I-CSCF network element to a Home Subscriber Server (HSS) network element;
electronically generating at the first one of the network elements (NEs) a trace record that records information associated with a communication session and that includes a charging identifier that is used as a trace recording session reference for the trace session; and
distributing to a second one of the NEs the charging identifier for use as a trace recording session reference.

2. The computer-implemented method of claim 1, further comprising:

electronically receiving at the first one of the network elements the IP Multimedia Subsystem (IMS) Charging IDentifier (ICID) in the P-Charging-Vector header of the first SIP message; and electronically writing the ICID as the trace recording session reference in the trace record at the first one of the network elements.

3. The computer-implemented method of claim 1, further comprising:

electronically receiving at the first one of the network elements the IP Multimedia Subsystem (IMS) Charging IDentifier (ICID) in the Attribute-Value-Pair (AVP) of the first Diameter protocol message; and electronically writing the ICID as the trace recording session reference in the trace record at the first one of the network elements.

4. The computer-implemented method of claim 3, wherein:

electronically receiving at the first one of the network elements the ICID in the AVP of the first Diameter protocol message comprises receiving the ICID in a Session-ID AVP of the first Diameter protocol message.

5. The computer-implemented method of claim 4, wherein:

electronically receiving the ICID in a Session-ID AVP of the first Diameter protocol message comprises receiving the ICID as a value that follows another value that identifies a message sender.

6. The computer-implemented method of claim 3, wherein:

electronically writing the ICID as the trace recording session reference in the trace record at the first one of the network elements is carried out responsive to receipt of a subsequent Diameter protocol message that has a public identity AVP that matches a user identifier that is associated with the trace session.

7. The computer-implemented method of claim 6, wherein the first one of the network elements comprises a Serving Call Session Control Function (S-CSCF), and further comprising communicating the received ICID from the S-CSCF to the Interrogating Call Session Control Function (I-CSCF) within a P-Charging-Vector header of a SIP message.

8. The computer-implemented method of claim 1, further comprising:

operating the I-CSCF network element to write the ICID as a trace recording session reference in a trace record at the I-CSCF network element in response to receipt of a second SIP message at the I-CSCF network element that has a P-Asserted Identity (PAI) header that matches a user identifier that is associated with the trace session and/or has a Request-URI header that matches the user identifier that is associated with the trace session.

9. The computer-implemented method of claim 1, further comprising:

operating the HSS network element to write the ICID as a trace recording session reference in a trace record at the HSS network element in response to receipt of a second Diameter protocol message that has a public identity AVP that matches a user identifier that is associated with the trace session.

10. The computer-implemented method of claim 1, further comprising:

responsive to receiving the first SIP message at the S-CSCF network element, generating a third SIP message with the ICID in a P-Charging-Vector header and communicating the third SIP message from the S-CSCF network element to a Proxy Call Session Control Function (P-CSCF) network element; and further responsive to receiving the first SIP message at the S-CSCF network element, generating a fourth SIP message with the ICID in a P-Charging-Vector header and communicating the fourth SIP message from the S-CSCF network element to an Application Server (AS).

11. The computer-implemented method of claim 10, further comprising:

operating the P-CSCF network element to write the ICID as a trace recording session reference in a trace record at the P-CSCF network element in response to receipt of a fifth SIP message at the P-CSCF network element that has a P-called-party-ID header that matches a user identifier that is associated with the trace session.

12. The method of claim 1, wherein the charging identifier is used as the trace recording session reference by at least two network elements from the plurality of network elements.

13. The method of claim 1, wherein the charging identifier is used as the trace recording session reference by each network element from the plurality of network elements.

\* \* \* \* \*